Nov. 8, 1955
D. MARVOSH
2,722,957
MACHINE FOR MANUFACTURING TABLE TOPS
Filed July 20, 1953
2 Sheets-Sheet 1
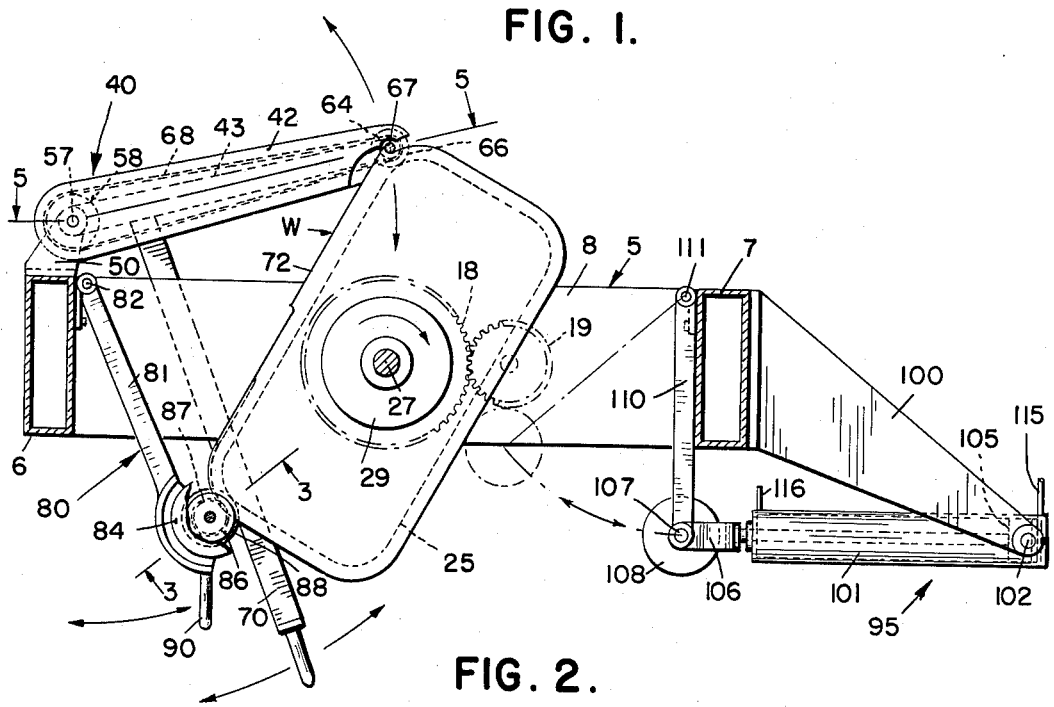
INVENTOR
DAN MARVOSH
BY
Mason & Graham
ATTORNEYS Nov. 8, 1955  D. MARVOSH  2,722,957
MACHINE FOR MANUFACTURING TABLE TOPS
Filed July 20, 1953  2 Sheets-Sheet 2
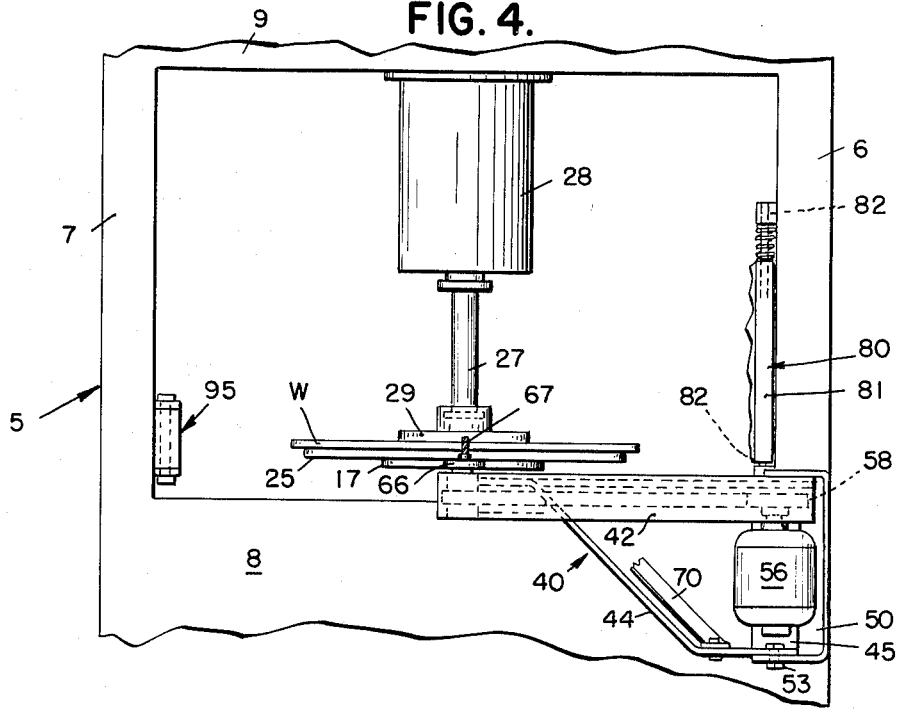
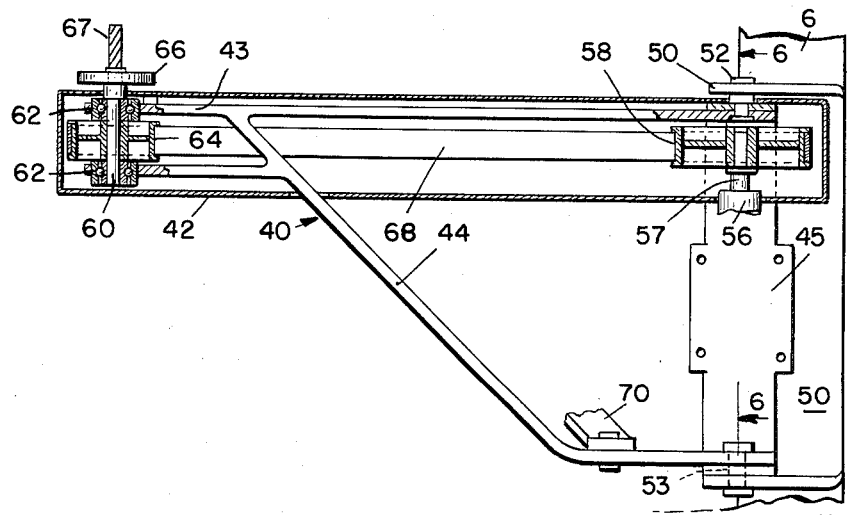
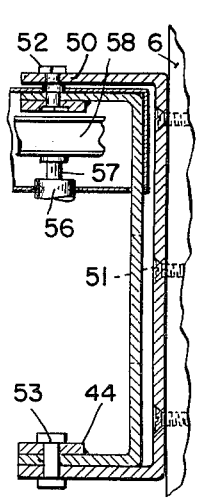
INVENTOR
DAN MARVOSH
BY
*Mason & Graham*
ATTORNEYS

United States Patent Office 2,722,957
Patented Nov. 8, 1955

2,722,957

MACHINE FOR MANUFACTURING TABLE TOPS

Dan Marvosh, Pasadena, Calif.

Application July 20, 1953, Serial No. 369,021

2 Claims. (Cl. 144—134)

This invention has to do with furniture manufacturing machinery and relates more particularly to a machine for the manufacture of table tops.

In the manufacture of table tops, the top is often provided about its perimeter with a metal trim strip, the top being provided with a longitudinal perimetric groove while the trim strip has a corresponding rib which is forced into the groove. According to present practice, the blank from which the table top is to be formed is first cut on a shaping machine provided for the purpose so as to provide it with proper outline, after which the shaped top is moved to a routing machine for the provision of the perimetric groove, and then the trim strip is applied.

Those working in this are have long sought to provide a single machine capable of performing all said operations, including the initial cutting of the blank into the proper table top outline, the routing and finally the application of the trim strip. While I am aware that a prior machine has been proposed which is capable of providing the groove in the table top, as well as the application of the trim strip, said machine has been incapable of cutting the blank into the outline desired for the table top and it has presented difficulties in properly guiding the routing tool used in forming the perimetric groove.

It is an object of my present invention to provide a table top making machine which renders it possible, by the use of a single machine and template, to cut the blank into the proper outline, provide the perimetric groove in the shaped table top, and apply the metal trim strip.

It is also an object of my present invention to provide novel means for initially cutting and shaping a table top from a blank.

A further object is to provide improved means for guiding the routing tool about the perimeter of a table top.

Other objects will become apparent from the following description of a presently preferred embodiment of the invention, for which purpose I shall refer to the accompanying drawings, wherein:

Fig. 1 is a plan view partly in section;

Fig. 2 is a front elevation;

Fig. 3 is an enlarged view taken on line 3—3 of Fig. 1;

Fig. 4 is a rear elevation;

Fig. 5 is an enlarged view partly in section and partly in elevation taken on line 5—5 of Fig. 1; and Fig. 6 is a view taken on line 6—6 of Fig. 5, the motor element being omitted from the view.

In general, I provide a supporting frame carrying a driven work-holding turntable rotatably carried by the frame; and pivotally secured to the frame about the turntable, in position to engage work being rotated by the turntable, I provide a cutter for initially cutting the blank into the desired table top outline, a routing tool for perimetrically grooving the table top, and a metal trim strip applicator for applying the trim strip to the perimeter of the table top.

Referring more particularly to the drawings, I show at 5 a supporting frame having upright sides 6, 7 and cross members 8, 9. A vertical shaft 15 is journaled in cross member 8 and carries at its top a flat disk or turntable 17. The shaft is driven, through meshing gears 18, 19, by a conventional motor 20 and carries a thrust collar 21.

A template 25, whose perimeter defines the shape of the desired table top, rests flatly against the turntable and the work blank W from which the table top is to be formed is placed flatly atop the template. Preferably the template has upstanding barbs 26 to pierce the blank W.

A ram 27 is hydraulically actuated from a cylinder 28 supported from cross member 9. The lower end of the ram rotatably carries a clamping plate 29, so that when the ram 27 is protracted by introduction of air or fluid under pressure into the cylinder through conduit 30, from a source not shown, the clamping plate firmly clamps the work W and template 25 against the turntable. To release this clamping action conduit 30 is opened and a valve, not shown, controlling conduit 30, is opened while fluid under pressure is introduced into the cylinder through valve-controlled conduit 31 from a source not shown.

In the process of manufacturing a table top, after the template and blank are thus clamped against the table, the first operation in the use of my machine is to so cut or form the blank as to provide it with the outline desired for the table top. In my machine, this is accomplished by a cutter element generally designated by the numeral 40. This element comprises a housing 42 in which is disposed an arm 43 from which a brace 44 extends diagonally downwardly. A U-shaped bracket 50 is fixed to side 6 as by bolts 51. The right hand ends of arm 43 and brace 44, as well as a U-shaped motor mount 45, are pivotally secured to the bracket 50 by pins 52, 53. An electric motor 56 is secured to the motor mount, the motor shaft 57 having a pulley 58 secured to its upper end.

In the outer end of the cutter element 40 a vertical shaft 60 is carried, being journaled in ball bearing races 62 carried by arm 43 and brace 44 and carrying a pulley 64. The upper end of the shaft 60 extends through the housing 42 and carries a follower roller 66 and a rotary cutter 67. Pulley 64 is driven from pulley 58 by a belt 68. Preferably, the described bracket 50 is secured to side 6 at the back of the latter, and, so that the follower roller 66 may be held in guiding engagement with the template 25, I provide a handle 70 which is secured at one end to brace 44 and extends therefrom to the front of the machine, as best seen in Fig. 1. Thus, as the operator, by means of handle 70, holds the follower roller 66 in engagement with the periphery of the template and operates the motor 56, the cutter 67 cuts off the excess material 72 (Fig. 1) from the work blank W to provide the latter with the desired outline, here shown as being generally rectangular with rounded corners.

The next operation is to provide a longitudinal groove in the perimeter of the work W and this is accomplished by the routing element generally designated by the numeral 80. This element comprises a bracket 81 pivotally mounted at 82 on side 6 at the front thereof, and carrying at its free end a motor 84 on whose driven shaft there are mounted in vertically spaced relationship a guide disk 86, a routing tool 87, and a follower roller 88. Between the disk 86 and routing tool 87, I may provide a finishing cutter 89 to smooth that portion of the perimeter of the table top engaged thereby, and a like finishing cutter 89a may be provided between the routing tool of the follower roller 88 for the same purpose. A suitable cutter for this purpose could be provided by merely knurling the spacer elements between those members. The disk 86 functions as a guide to insure that the groove cut by the routing tool will be a predetermined and uniform distance from the top surface of the table. The follower roller 88 is manually held against the perimeter of the template by means of a handle 90.

After the table top has been cut to outline by the cutter 67, and after a longitudinal groove has been provided in the perimeter of the table top by the routing tool 87, the table top is then ready for the application of the trim strip which, as before stated, usually has a longitudinally embossed rib portion to engage in the groove. Application of this strip, not shown, is started by manually placing one end of the strip against the perimeter of the table top with the bead of the strip registering with the groove, and the strip is then applied by means of the applicator element generally designated 95.

Element 95 comprises a bracket 100 fixed at one end to side 7. A cylinder 101 is pivoted at its right end to the bracket, as shown at 102. Piston 105 reciprocates in the cylinder and carries at its outer end a yoke 106 carrying a shaft 107 upon which a pressure applying roller 108 is mounted. An arm 110 is pivoted at 111 to side 7 and has at its other end a bifurcation 112 pivotally connected to the ends of the shaft 107 to swing relative to the yoke. Valve-controlled fluid-passing conduits 115, 116 communicate with the cylinder behind and ahead of the piston head for causing protraction and retraction of the piston, the conduits being connected with a suitable source of fluid under pressure, not shown. To apply the trim strip, fluid under pressure is admitted through conduit 115, which causes the roller 108 to press the trim strip against the perimeter of the table top as the latter is rotated by means of the turntable. When the trim strip is applied, pressure is released through conduit 115 while pressure is applied through conduit 116 to retract the piston. The machine is then in condition to remove the finished table top by admitting fluid under pressure into cylinder 28 through conduit 31 and manually lifting the table top from the template.

I claim:

1. In a machine of the type described, a frame, a U-shaped bracket having a base portion attached to said frame and having laterally spaced legs projecting free of the frame, a U-shaped motor mounting plate pivotally mounted on the projecting legs of said bracket, a motor carried by said plate having a drive shaft aligned with the pivotal mounting axis of said plate, a cutter-supporting arm pivotally supported on said bracket for swinging movement about the pivotal axis of said plate, a cutter rotatably mounted at the free end of said arm, and a driving connection between the drive shaft of said motor and said cutter.

2. A machine as set forth in claim 1 in which an elongated handle is rigidly mounted on said cutter supporting arm intermediate the ends of the arm and projects laterally of the arm.

References Cited in the file of this patent
UNITED STATES PATENTS

| | | |
|---|---|---|
| 429,213 | Jacobson | June 3, 1890 |
| 463,836 | Hunzinger | Nov. 24, 1891 |
| 626,718 | Pearson | June 13, 1899 |
| 1,647,969 | Long | Nov. 1, 1927 |
| 1,685,572 | Onsrud | Sept. 25, 1928 |
| 1,921,715 | Whitney | Aug. 8, 1933 |
| 2,599,712 | Izen | June 10, 1952 |